(12) United States Patent
Eberhart et al.

(10) Patent No.: US 10,813,494 B2
(45) Date of Patent: Oct. 27, 2020

(54) SHIELD FOR AIR-BASED FRYER APPARATUS

(71) Applicant: KONINKLIJKE PHILIPS N.V., Eindhoven (NL)

(72) Inventors: Ingolf Ronald Eberhart, Eindhoven (NL); Gerald Kauer, Eindhoven (NL); Ingrid Hiet-Brink, Eindhoven (NL); Jan Vaupot, Eindhoven (NL); Stefan Hans Sauer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 93 days.

(21) Appl. No.: 15/780,066

(22) PCT Filed: Dec. 6, 2016

(86) PCT No.: PCT/EP2016/079963
§ 371 (c)(1),
(2) Date: May 30, 2018

(87) PCT Pub. No.: WO2017/097790
PCT Pub. Date: Jun. 15, 2017

(65) Prior Publication Data
US 2018/0353007 A1 Dec. 13, 2018

(30) Foreign Application Priority Data

Dec. 7, 2015 (EP) ..................................... 15198200

(51) Int. Cl.
*A47J 37/06* (2006.01)
*A21B 1/26* (2006.01)
(Continued)

(52) U.S. Cl.
CPC ........... *A47J 37/0664* (2013.01); *A47J 36/38* (2013.01); *A47J 37/0641* (2013.01); *A47J 37/1271* (2013.01)

(58) Field of Classification Search
CPC ............... A47J 37/0629–0652; A21B 1/24–26
See application file for complete search history.

(56) References Cited

U.S. PATENT DOCUMENTS

| | | | | |
|---|---|---|---|---|
| 1,949,361 A | * | 2/1934 | Starr | A47J 37/0857 99/386 |
| 2,636,636 A | * | 4/1953 | Smith | A47J 36/06 220/369 |

(Continued)

FOREIGN PATENT DOCUMENTS

| | | |
|---|---|---|
| CN | 103767562 A | 4/2014 |
| FR | 2984708 A1 | 6/2013 |

(Continued)

*Primary Examiner* — Michael A LaFlame, Jr.

(57) ABSTRACT

An air-based fryer apparatus (100) includes a shield (101) for use in a cooking apparatus (100), the cooking apparatus having a food preparation chamber (102) to receive a food support (103), a system (104) for circulating a flow of hot air inside the food preparation chamber (102) and a heating element (105) to heat at least the circulated air. The shield (101), disposed between the heating element (105) and the food support (103), comprises a plurality of inclined surfaces (112) and a plurality of apertures (111) between the inclined surfaces (112) through which the flow of hot air can pass. The inclined surfaces (112) block a direct line of sight through the apertures (111) in the shield (101) from the heating element (105) to the food support (103) to prevent air flowing from the food support (103) to the heating element (105) through the apertures without being deflected by the inclined surfaces.

20 Claims, 8 Drawing Sheets

(51) Int. Cl.
*A21B 1/24* (2006.01)
*A47J 36/38* (2006.01)
*A47J 37/12* (2006.01)

(56) References Cited

U.S. PATENT DOCUMENTS

| | | | |
|---|---|---|---|
| 2,702,143 A * | 2/1955 | Williamson | A47J 37/101 |
| | | | 220/369 |
| 3,425,364 A * | 2/1969 | Martin, Jr. | A21B 1/44 |
| | | | 432/65 |
| 3,692,968 A | 9/1972 | Yasuoka | |
| 3,744,951 A * | 7/1973 | Szatkowski | B29C 41/006 |
| | | | 425/259 |
| 4,374,318 A | 2/1983 | Gilliom | |
| 4,384,513 A * | 5/1983 | Pierick | A21B 1/26 |
| | | | 126/275 R |
| 4,409,453 A * | 10/1983 | Smith | A23L 3/10 |
| | | | 219/684 |
| 5,012,071 A | 4/1991 | Henke | |
| 5,403,607 A | 4/1995 | Erickson | |
| 5,526,734 A * | 6/1996 | Harrison | A47J 37/0641 |
| | | | 126/21 A |
| 5,676,044 A | 10/1997 | Lara, Jr. | |
| 5,805,769 A * | 9/1998 | Cook | A47J 37/0635 |
| | | | 362/281 |
| 6,201,217 B1 | 3/2001 | Moon | |
| 6,747,250 B1 | 6/2004 | Cha | |
| 6,870,136 B1 * | 3/2005 | Majordy | F27D 7/04 |
| | | | 219/400 |
| 8,430,024 B2 | 4/2013 | Chang | |
| 2004/0253348 A1 * | 12/2004 | Woodward | A47J 36/06 |
| | | | 426/94 |
| 2012/0168423 A1 | 7/2012 | Hitchcock | |
| 2014/0083992 A1 * | 3/2014 | Linnewiel | A47J 37/0641 |
| | | | 219/400 |
| 2014/0196612 A1 * | 7/2014 | Kamii | F24C 7/02 |
| | | | 99/447 |

FOREIGN PATENT DOCUMENTS

| WO | 8800681 A1 | 1/1988 |
| WO | 9000362 A1 | 1/1990 |
| WO | 2015028940 A1 | 3/2015 |

* cited by examiner

SHIELD FOR AIR-BASED FRYER APPARATUS

This application is the U.S. National Phase application under 35 U.S.C. § 371 of International Application No. PCT/EP2016/079963, filed on Dec. 6, 2016, which claims the benefit of International Application No. 15198200.6 filed on Dec. 7, 2015. These applications are hereby incorporated by reference herein.

FIELD OF THE INVENTION

The invention relates to a shield for a heating element in a cooking apparatus and, in particular, to such a shield for use with an air-based fryer.

The invention also relates to a cooking apparatus comprising such a shield and to a method of reducing pollution of a heating element and/or of reducing fumes emission of a cooking apparatus.

BACKGROUND OF THE INVENTION

Air-based fryers are known for cooking food ingredients wherein the heat for preparing the food ingredients is provided by hot air. To heat the food ingredients, a flow of hot air is generated to pass over the food ingredients placed in a food basket within a cooking chamber. This type of appliance can be used in the household environment. However, with such appliances, fumes are sometimes generated during the cooking process. However, it is preferable to minimise the amount of fumes generated for hygiene, odour and safety reasons. Although reduction of fumes can be achieved, for example, by reducing the temperature of the hot air circulating, this is not always practical as many food types require a relatively high cooking temperature, for example over 160° C. WO90/00362 proposes a solution wherein air is forced to make a 180 degree turn around a plate before reaching the heating element, thus causing fat suspended in said air to deposit on said plate before reaching the heating element. U.S. Pat. No. 5,012,071 discloses a splatter shield for a baking pan in an impingement oven. The shield comprises elongated fins or rods that overlap in vertical direction, thus obstructing a direct line-of-sight out of the baking pan. The shield allows jets of hot air to enter and leave the pan while causing fat suspended in said air to deposit on the fins.

OBJECT AND SUMMARY OF THE INVENTION

It is an object of the invention to provide a shield for use in a cooking apparatus, and a cooking apparatus having such a shield, that substantially alleviates or overcomes one or more of the problems mentioned above.

The invention is defined by the independent claims. The dependent claims define advantageous embodiments.

According to the present invention there is provided a shield for use in a cooking apparatus having a food preparation chamber to receive a food support, a system for circulating a flow of hot air inside the food preparation chamber and a heating element to heat at least the circulated air, the shield being configured to be disposed between the heating element and the food support, the shield comprising a plurality of inclined surfaces and a plurality of apertures between the inclined surfaces through which the flow of hot air can pass.

Among various advantages, the shield advantageously helps in particular preventing particles of food, oil and grease, in particular particles carried by the air flow, from contacting the heating element, thereby reducing pollution of the heating element and reducing the amount of smoke generated during a cooking operation, whilst also allowing passage of hot air flow through the shield, and allow radiation from the heating element passes through the shield.

The inclined surfaces may comprise a plurality of blades and the blades may extend radially from a central portion of the shield. This may form an efficient shield configuration to optimise aperture area and air flow deflection.

The inclined surfaces may be configured to deflect the air flow as it passes through the apertures. The inclined surfaces may guide the airflow in a particular direction by passing through the shield. The inclined surfaces may curve radially outwards. For example, the inclined surfaces may impart a swirling motion to the airflow. Advantageously, this may help towards more homogenous cooking of food and/or more uniform heat distribution in the air flow.

The shield may extend in a first plane and the inclined surfaces may block a direct line of sight in a first direction substantially perpendicular to the first plane though the apertures in the shield. This may advantageously allow air to pass through the shield but prevent splatter of food particles, oil or grease directly from the food support to the heating element. The shield may advantageously be configured so that air flowing in the first direction through the apertures is deflected by the inclined surfaces.

The shield may comprise an inner ring and an outer ring, and the inclined surfaces may extend between the inner ring and the outer ring. This may allow optimised area for inclined surfaces and apertures in the shield with reduced amount shield area that blocks air flow.

The shield may extend in a first plane and the inclined surfaces may be angled at around 30 degrees to the first plane, and may be angles at between 25 to 35 degrees. This advantageously balances freedom of hot airflow through the shield for improved cooking performance, and blocking of direct line of passage through the shield to prevent food particle, oil or grease splatter to reduce heating element pollution and smoke generation.

The shield may comprise a unitary component formed from a single body of material. For example, by stamping a sheet material. This advantageously provides a simple and cost-effective shield and method of manufacture.

The shield may comprise a set of first inclined surfaces and a set of second inclined surfaces, and the first and second inclined surfaces may be moveable relative to each other to adjust the size of the apertures in the shield. This allows control of the aperture size and therefore balance of freedom of hot airflow through the shield for improved cooking performance, and blocking of direct line of passage through the shield to prevent food particle, oil or grease splatter to reduce heating element pollution and smoke generation The sets of first and second inclined surfaces may each comprise a first and second array of radial blades extending from first and second hubs respectively, and the first and second arrays of blades may be rotatable about a common axis relative to each other.

The shield may be formed from metal taken among the set of materials defined by stainless steel and aluminium. These may advantageously provide heat resistance, emissivity, ease of cleaning and/or light weight.

The present invention also provides an air-based fryer apparatus for preparing food, the apparatus comprising:
 a food preparation chamber;
 a food support receivable in the food preparation chamber;

a system for circulating a flow of hot air inside the food preparation chamber;

a heating element to heat at least the circulated air; and a shield according to any preceding claim disposed between the heating element and the food support.

The food support may comprise a food basket. The food support may alternatively comprise a plate, pan or other suitable means for supporting food to be cooked. The system for circulating air may be configured to circulate a vertical flow of air inside the food preparation camber, and advantageously an upward flow of air inside the food preparation chamber and advantageously upward through the food support.

Alternatively, the system for circulating air may be configured to circulate a downward flow of air inside the food preparation chamber and advantageously downwards through the food support. Such downward flow of air may pass over the heating element, through the shield and into the food preparation chamber to the food on the food support. In a yet further alternative optional embodiment, the heating element and shield may be disposed below the food support, and the downward flow of air may pass from the food support, through the shield, over the heating element and be recirculated to pass back to the food support.

The air-based fryer apparatus may comprise a heater compartment formed above the food preparation chamber, and the shield may be detachably connected to the heater compartment. The shield may be spaced from the food support. This advantageously provides ease of removal for cleaning. Also location spaced from the food preparation chamber and/or food support may reduce pollution of the shield by food residue. The heater compartment may include a reflector disposed adjacent to the heating element and distal from the food support.

The heater compartment and the shield may comprise first and second engageable connection elements respectively, to enable the shield to be detachably connected to the heater compartment.

The inclined surfaces may block a direct line of sight vertically though the apertures in the shield to prevent air flowing upwards from the food support to the heating element through the apertures without being deflected by the inclined surfaces. This may advantageously allow air to pass through the shield but prevent splatter of food particles, oil or grease directly from the food support to the heating element.

The shield may extend over the entire area of the heating element. This may advantageously optimise avoiding pollution of the heating element over its entire area.

The present invention also provides a method of reducing emission of fumes in a cooking apparatus comprising a food preparation chamber, a food support receivable in the food preparation chamber, a system for circulating a flow of hot air inside the food preparation chamber, a heating element to heat at least the circulated air, the method comprising the steps of:

disposing a shield between the heating element and the food support including a plurality of apertures and a plurality of inclined surfaces; and passing the flow of hot air through the apertures.

The method may include altering the direction of flow of hot air by the inclined surfaces as the hot air passes through the apertures.

The heating element may be disposed above the food support, and the method may include disposing the shield below the heating element and above the food support. The method may include passing the flow of hot air through the apertures from the food support. The method may include passing an upward flow of hot air through the apertures from the food support.

With known air-based fryers, a large proportion of the flow of hot air flows upwards directly from the food basket to the heating element. This may result in generation of fumes, particularly if oil and/or fat particles are splattered onto the heating element, or are conveyed in the heated airflow upwards to the heating element, because the particles of oil and fat burn when coming into contact with the high-temperature heating element.

With the present invention, the shield protects the heating element and also, if present, the reflector, from pollution by oil and fat splatter from food on the food support. The shield presents a convolute path for at least a portion of the air flow from the cooking chamber to the heating element, and may prevent a direct straight path for the air flow from the cooking chamber to the heating element. Therefore, the amount of fumes generated is reduced since the air flow from the cooking chamber has to pass over at least a portion of the surface of the shield before reaching the heating element, and so the shield reduces splatter of oil and fat particles from the food being cooked within the cooking chamber from reaching the heating element.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
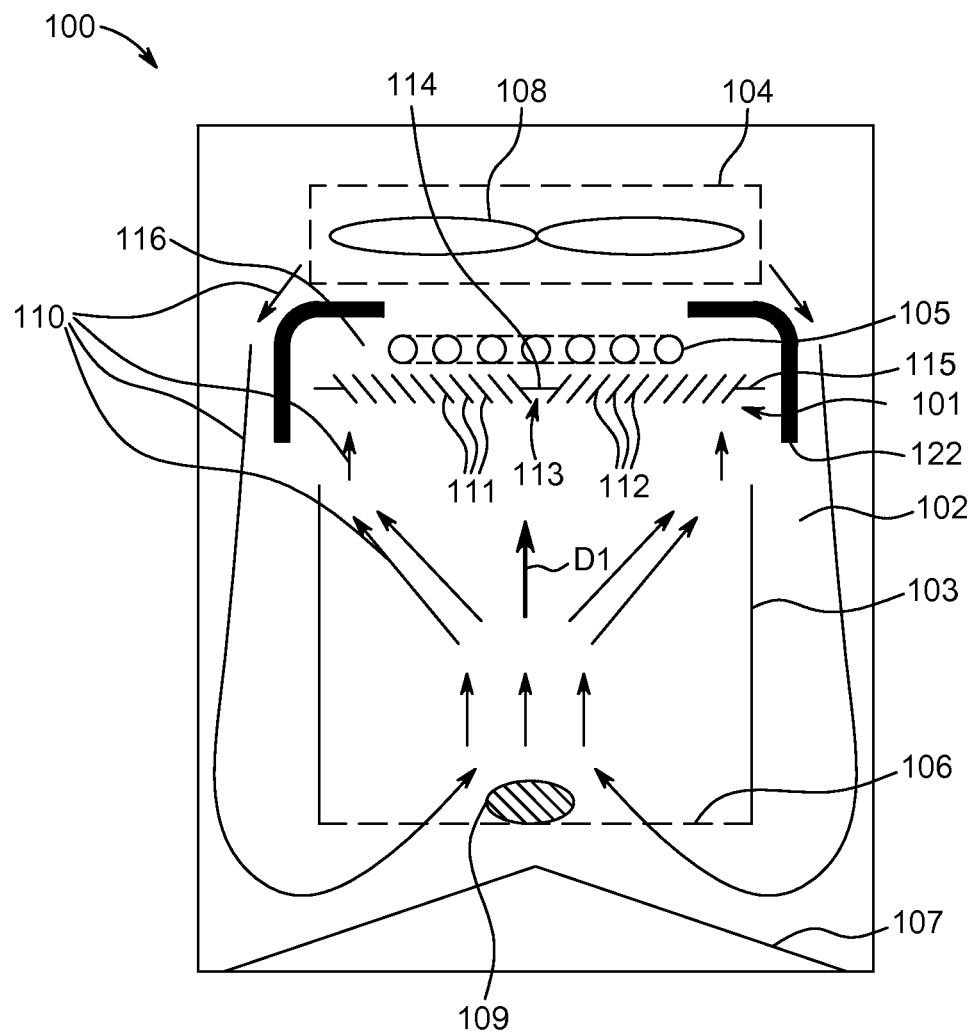
FIG. 1 shows a schematic view of a cooking apparatus including a shield according to a first embodiment of the invention.

FIG. 1 illustrates a shield 101 according to a first embodiment of the invention in use with a food cooking apparatus 100.

The present invention provides a shield 101 for use in a cooking apparatus 100 having a food preparation chamber 102 to receive a food support 103, a system 104 for circulating a flow of hot air inside the food preparation chamber 102 and a heating element 105 adjacent the food support 103. The shield 101 is configured to be disposed between the heating element 105 and the food support 103. The shield 101 comprises a plurality of inclined surfaces 112. The shield further comprises a plurality of apertures 111 between the inclined surfaces 112 through which the flow of hot air can pass.

In particular, the cooking apparatus 100 corresponds to an air-based fryer apparatus using circulation of hot air to cook food ingredients. Alternatively, a circulation of hot air mixed with liquid/water/moisture/steam could also be performed similarly.

The cooking apparatus 100 comprises a food preparation chamber 102, a food support 103, which may be in the form of a food basket (with or without vertical lateral walls), placed in the food preparation chamber 102, and a system 104 for circulating a flow of hot air inside the food basket 103. The system 104 may be configured to generate an upward flow of hot air inside the food basket 103. A heating element 105 may be placed above the food basket 103 to generate the hot air. For example, the heating element 105 is made of a spiral electrical heating tube. For example, the system 104 comprises a fan 108 placed above the heating element 105. The circulation of the flow of hot air is illustrated by various arrows 110. In this embodiment, the system 104 is preferably adapted to circulating the flow of hot air inside the food preparation chamber 102 from the food support 103 towards the heating element 105 (i.e. air flow is upwards). The food basket 103 may comprise a bottom part 106 with a plurality of openings (illustrated by a horizontal dashed segment, for example made of a meshed material extending horizontally). An air guide member 107 is optionally placed below the bottom part 106 to help direct air upward in the food basket 103.

Food ingredients 109 are intended to be placed on the bottom part 106 of the food basket 103, such that hot air which is circulated inside the apparatus flows towards the food ingredients 109 for cooking purpose. For example, food ingredient 109 corresponds to chips, potatoes, chicken wings, or any other food that can be cooked via hot air. When food is cooked, food is taken out from the apparatus via an opening on the lateral side of the apparatus (not shown), for example via a drawer mechanism. For example, if the apparatus is intended to domestic usage, a flow of hot air having a rate of 20 litres per second can be used, and the temperature of air is preferably in the range [80° C.; 250° C.].

The shield 101 is preferably disposed above the food basket 103 and is preferably spaced from the food basket 103. The cooking apparatus 100 may comprise a separate heater compartment 116 disposed above the food preparation chamber 102, and the heating element 105 is disposed in the heater compartment 116. The 101 shield may be disposed in the heater compartment 116 and spaced from the heating element 105. The heater compartment may additional comprise a reflector 122 for reflecting radiated heat towards the food preparation chamber 102. In additional, the reflector 122 may advantageously be configured to guide the flow of hot air, in particular to guide the flow of hot air from the heater compartment into the food preparation chamber 102. It should be appreciated that the reflector 122 shown in FIG. 1 is shown schematically and is not to scale in terms of size and material thickness. In addition, the outer vertical walls of the reflector 122 are preferably vertically aligned with the vertical walls of the food basket 103 and not off-set as shown in FIG. 1. The shield protects the reflector 122 against pollution by reducing oil and fat particles splattered from the food.

Figure 2:
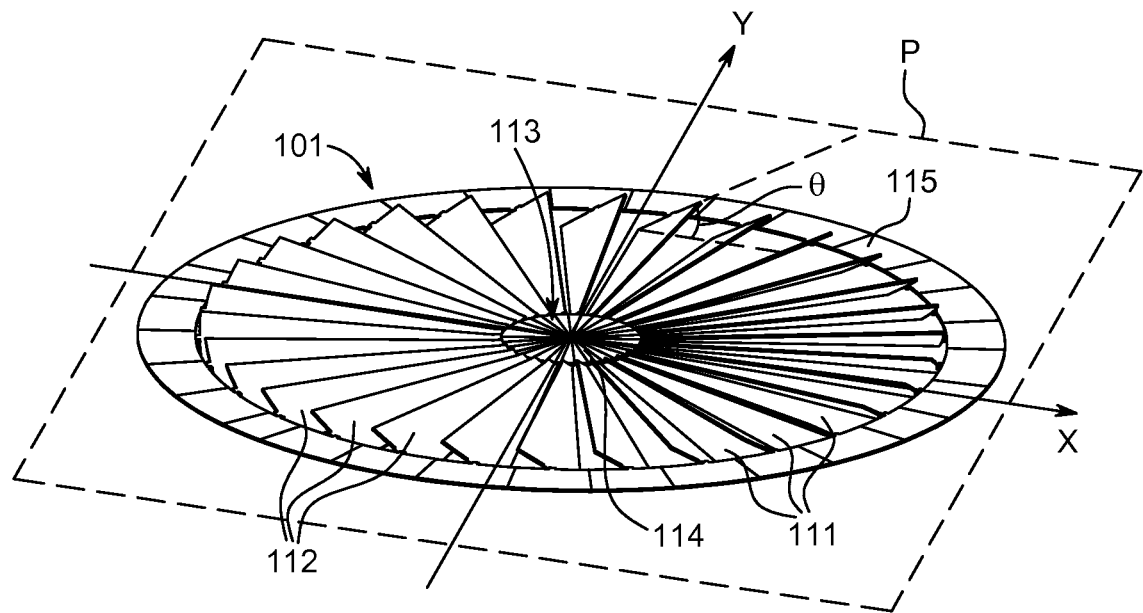
FIG. 2 shows the shield according to the first embodiment of the invention shown in FIG. 1.

FIG. 2 shows a first exemplary embodiment of a shield 101 of the invention. The inclined surfaces 112 may extend from a central portion 113 of the shield 101, for example radially from the central portion 113 of the shield 101, and may comprise a plurality of blades. The shield lid 101 preferably comprises an inner ring 114 at the central portion 113, and an outer ring 115, and the plurality of inclined surfaces 112 extend between the inner ring 114 and the outer ring 115. The inclined surfaces 112 may extend radially from the inner ring 114 to the outer ring 115.

The blades 112 of the exemplary embodiment of shield 101 shown of FIG. 2 are all set at an inclined angle. The shield 101 is generally a planar body that extends in a plane P defined by axes X, Y, as shown in FIG. 2. For example, the blades 112 are inclined at an angle θ of around 30 degrees to the plane P, although other angles of inclination θ are possible within the scope of the invention.

In use with the cooking apparatus 100, the shield 101 is disposed horizontally such that the plane P lies horizontally. For example, the shield 101 is configured such that a direct line of sight in a vertical direction D1 through the apertures 111 of the shield 101, that is, in a direction perpendicular to the plane P, is at least partially blocked, and may be entirely blocked. This prevents food particles and oil or grease splatter from the food 109 being cooked, from passing directly through the shield 101 from the food basket 103 to the heating element 105. This helps to prevent smoke being generated, as would happen if such food, oil or grease particles were to come into contact with the heating element 105.

Figure 3:
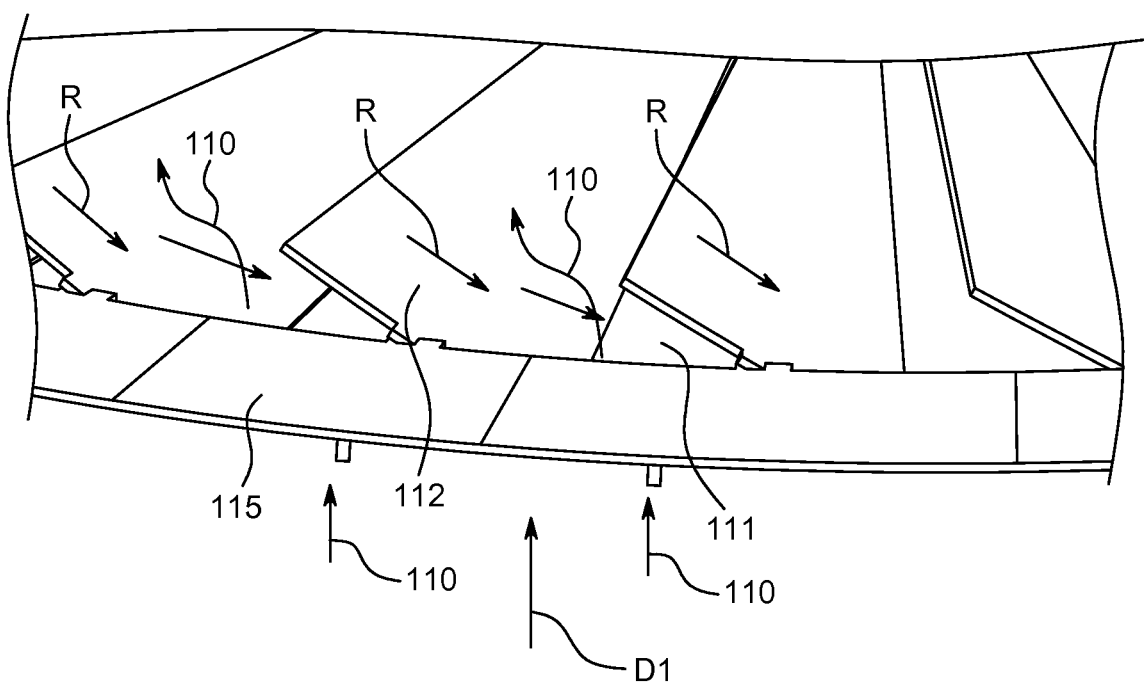
FIG. 3 shows an enlarged view of a section of the shield of FIG. 2, illustrating the flow of heated air and radiation through the shield in use of the cooking apparatus.

Due to the above-described exemplary configuration, circulation of the flow of hot air 110 flows vertically upwards within the food basket 103 in the direction D1 and meets the shield 101 at an angle substantially perpendicular to the shield 101, that is, perpendicular to the plane P of the shield 101. The shield 101 is configured such that at least some of the upward vertical flow of hot air 110 cannot pass directly through the apertures 111 in the shield 101 but instead is deflected by the inclined surfaces 112. The shield 101 may cause deflection of all upward flow of hot air 110 flowing through the apertures 111. This is shown by curved arrows 110 in FIG. 3. This deflection of the air flow 110 may further prevent particles of food, oil or grease from passing from the food basket 103 to the heating element 105, and may result in entrained particles of food, oil or grease returning back to the food basket 103 or adhering to the shield 101 for later removal and cleaning.

The shield 101 is preferably configured to allow radiation from the heating element 105 to pass at an angle through the apertures 111 in the shield 101. This is shown by arrows R in FIG. 3. This allows the radiation energy R from the heating element 105 to pass through the shield 101 to heat the food 109 in the food basket 103.

Figure 4:
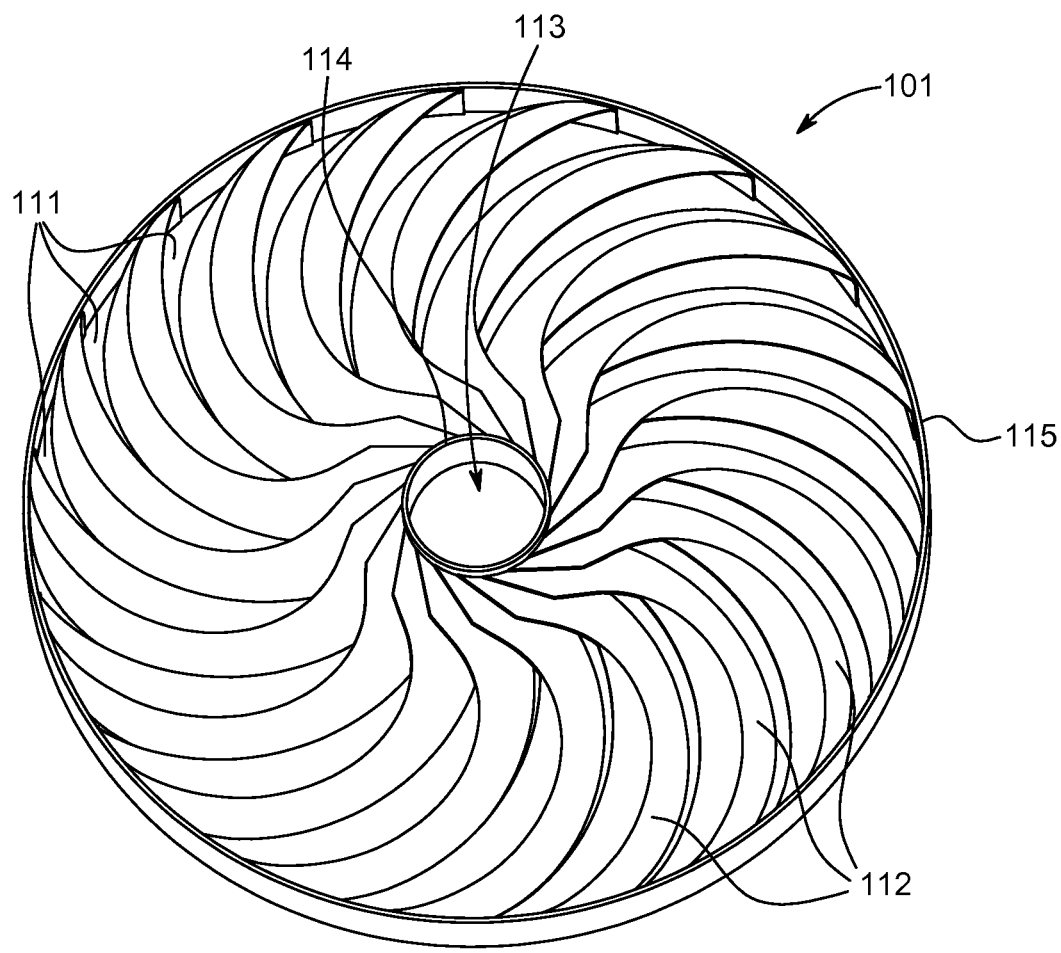
FIG. 4 shows a shield according to a second embodiment of the invention, for use with a cooking apparatus.

FIG. 4 shows a shield 101 of a second exemplary embodiment of the invention, including an inner ring 114 at the central portion 113 and an outer ring 115, and a plurality of angled blades 112 extending between the inner and outer rings 114, 115. In the shield 101 of the second embodiment, blades 112 are curved in the radial direction. However, the blades 112 still serve to at least partially block a direct line of sight in a vertical direction D1 through the apertures 111, and to deflect at least some of the upward vertical flow of hot air 110 through the apertures 111. For example, the shield 101 may entirely block a direct line of sight in a vertical direction D1 through the apertures 111 and cause deflection of all upward flow of hot air 110 flowing through the apertures 111. The shield 101 of the second embodiment therefore also provides the advantages described above with respect to the shield of the first embodiment of the invention. The configuration of blades may advantageously also impart a flow direction to the air passing though the shield, for example a swirling air flow which may create more uniformly heated air and result in more homogenously cooked food.

Figure 5:
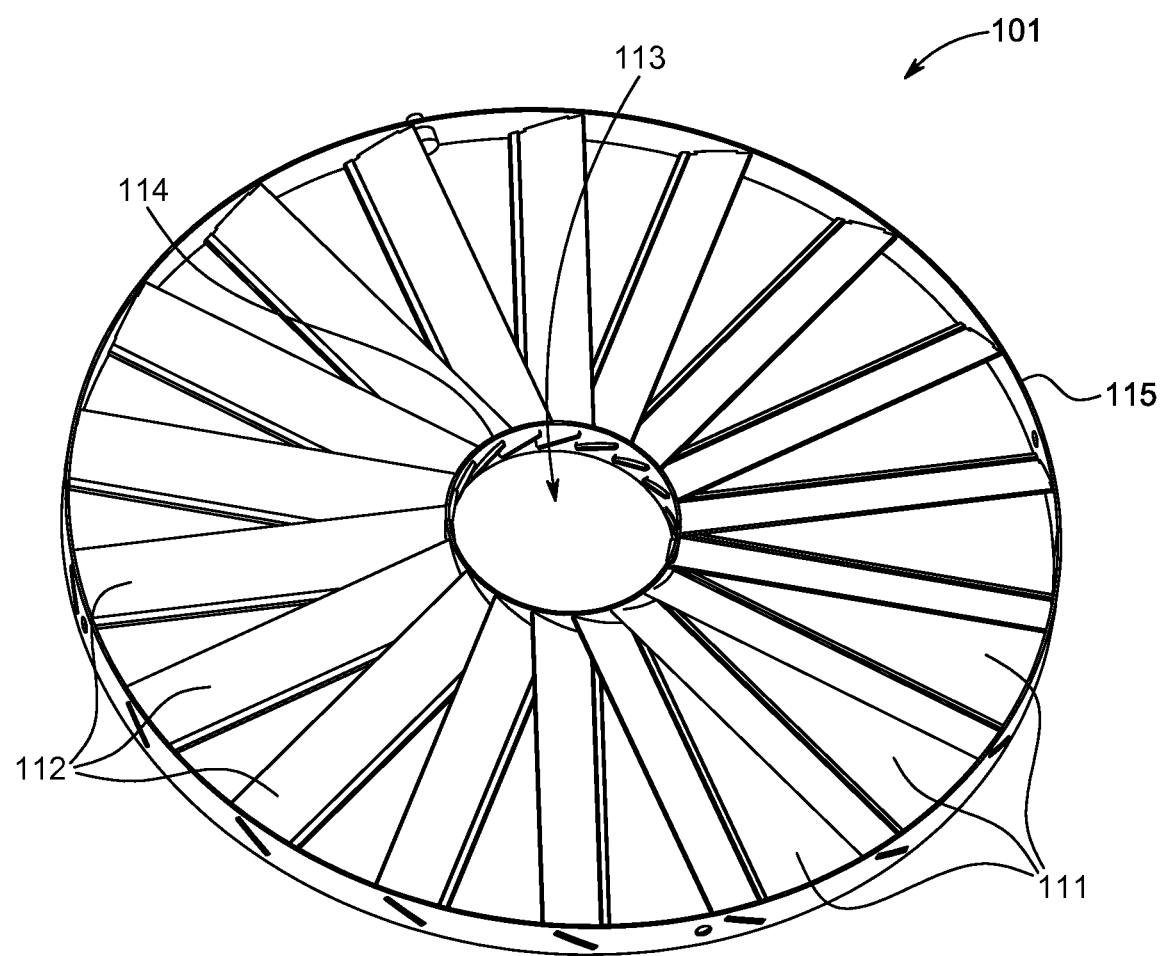
FIG. 5 shows a shield according to a third embodiment of the invention, for use with a cooking apparatus.

FIG. 5 shows a shield 101 of a third exemplary embodiment of the invention, including an inner ring 114 at the central portion 113 and an outer ring 115, and a plurality of angled blades 112 extending between the inner and outer rings 114, 115. In the shield 101 of the third embodiment, blades 112 are straight in the radial direction, and are further spaced to provide greater apertures 111 in the shield 101. This may allow greater hot air circulation and radiation to pass to the cooking basket 103. However, the blades 112 still serve to at least partially block a direct line of sight in a vertical direction D1 through the apertures 111, and to deflect at least some of the upward vertical flow of hot air 110 through the apertures 111, therefore also providing the advantages described above with respect to the shield of the first and second embodiments of the invention.

Figure 6:
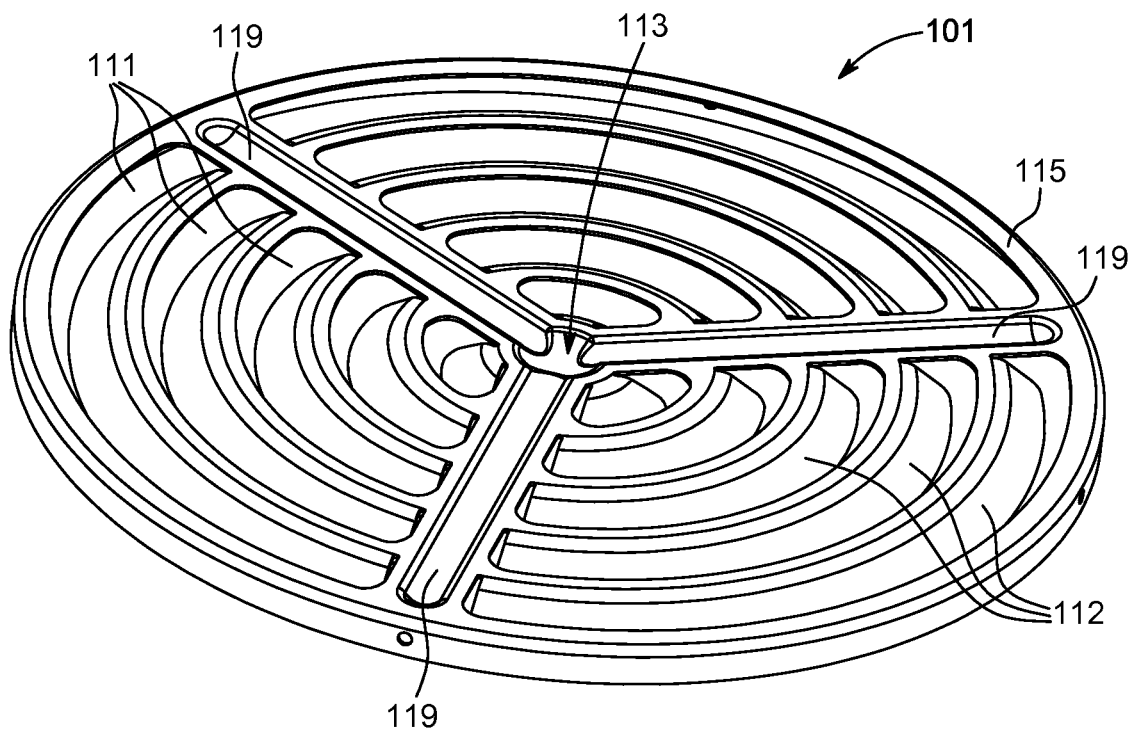
FIG. 6 shows a shield according to a fourth embodiment of the invention, for use with a cooking apparatus.

FIG. 6 shows a shield 101 of a fourth exemplary embodiment of the invention, including a central portion 113 and an outer ring 115. Three ribs 119 extend radially from the central portion 113 to the outer rib 115. A plurality of curved and angled blades 112 extend concentrically between the ribs 119. The blades 112 serve to at least partially block a direct line of sight in a vertical direction D1 through the apertures 111, and to deflect at least some of the upward vertical flow of hot air 110 through the apertures 111. For example, the shield 101 may entirely block a direct line of sight in a vertical direction D1 through the apertures 111 and cause deflection of all upward flow of hot air 110 flowing through the apertures 111. The shield 101 of the fourth embodiment therefore also provides the advantages described above with respect to the shields of the previous embodiments of the invention.

Figure 7:
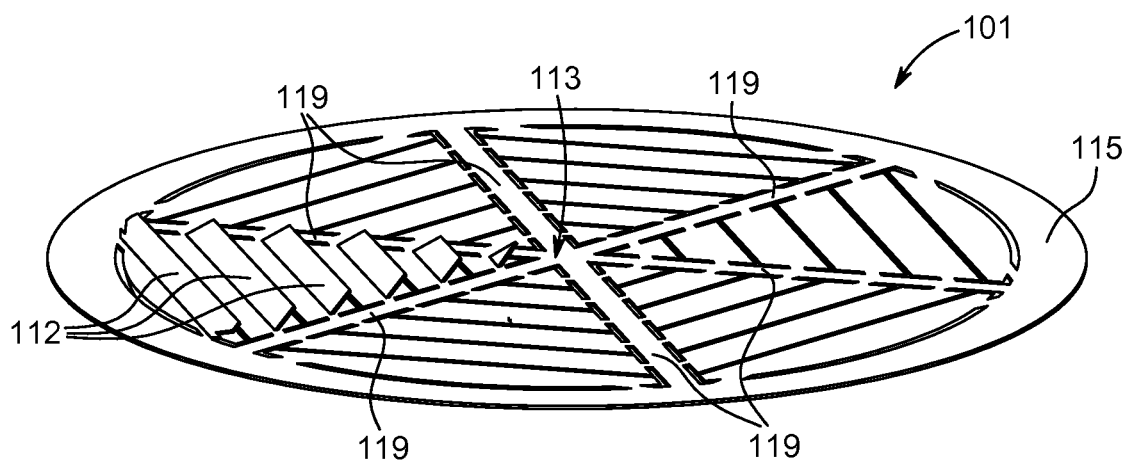
FIG. 7 shows a shield according to a fifth embodiment of the invention, for use with a cooking apparatus.
Figure 8:
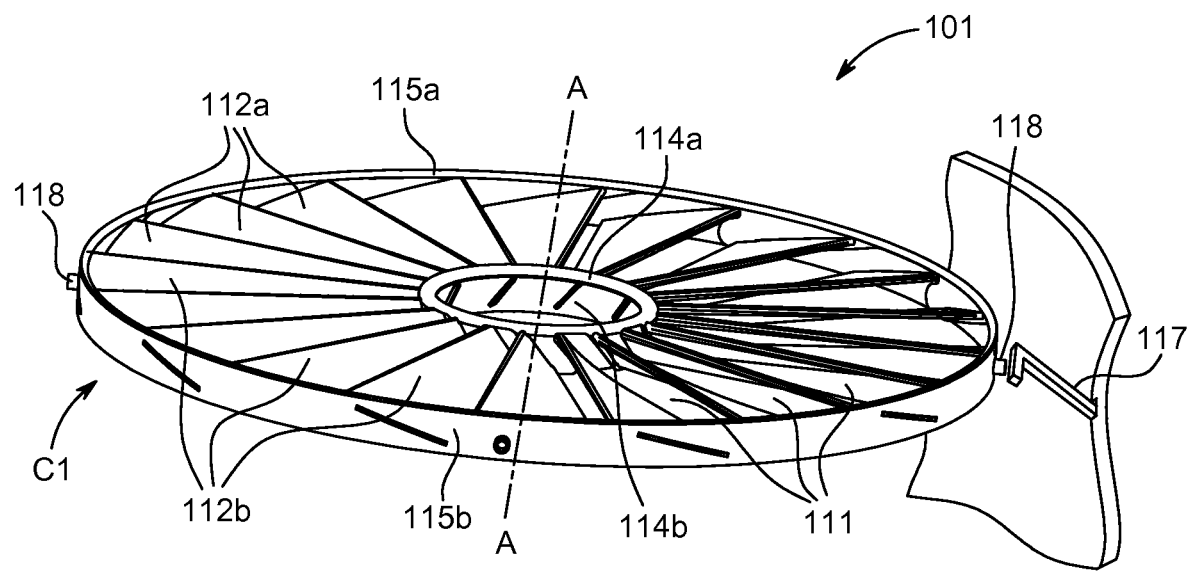
FIG. 8 shows a shield according to a sixth embodiment of the invention, for use with a cooking apparatus, with the shield disposed in a first configuration.
Figure 9:
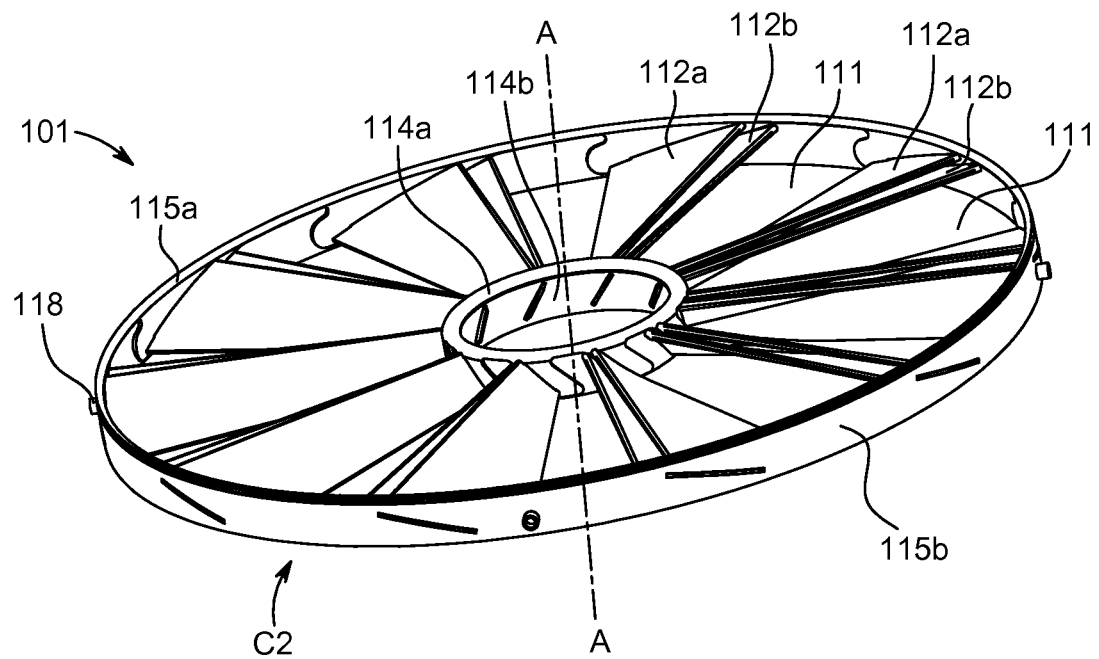
FIG. 9 shows the shield of the sixth embodiment of the invention shown in FIG. 8, disposed in a second configuration.
Figure 10:
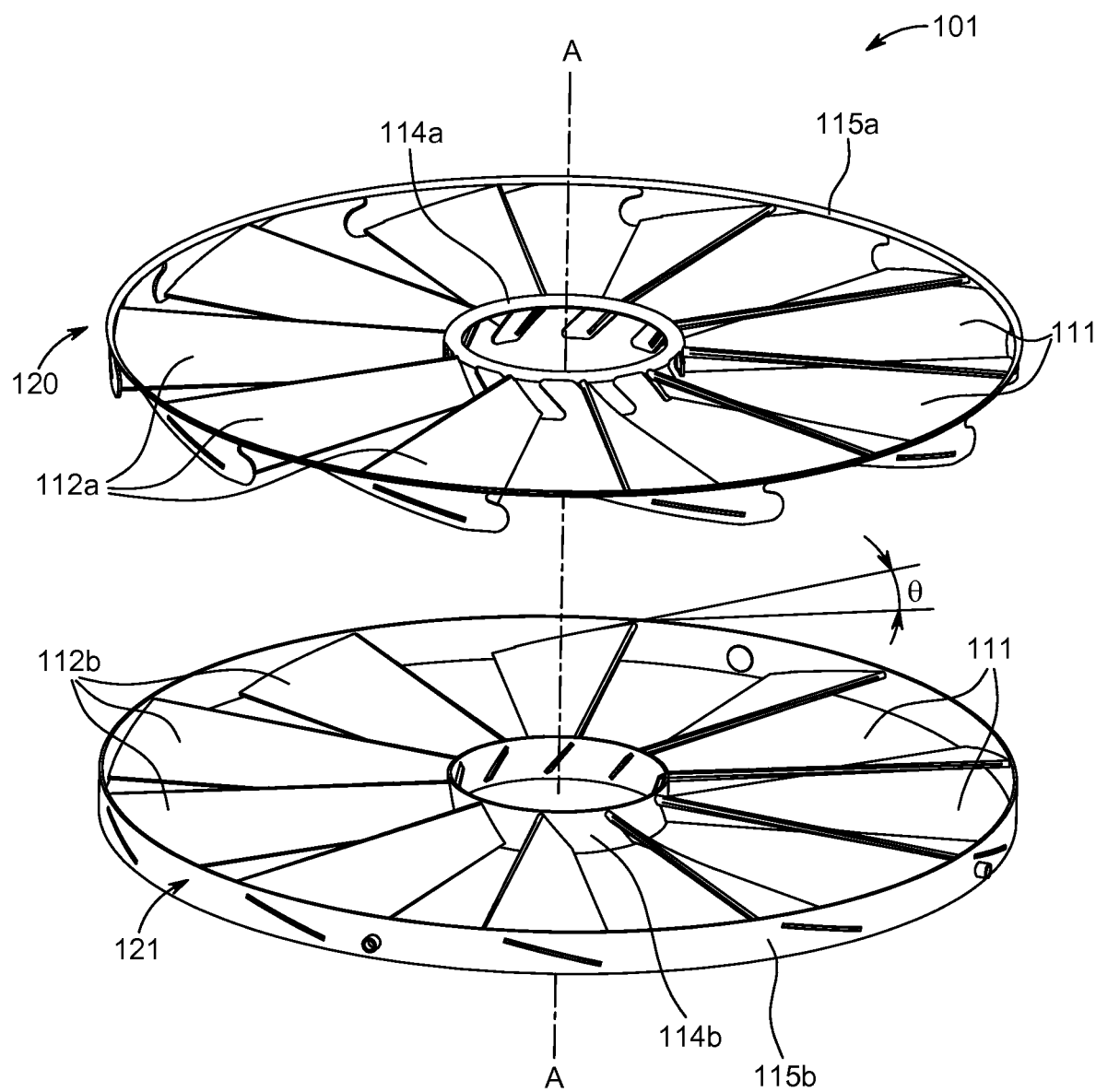
FIG. 10 shows an exploded view of the shield of the sixth embodiment of the invention shown in FIGS. 8 and 9.
Figure 11:
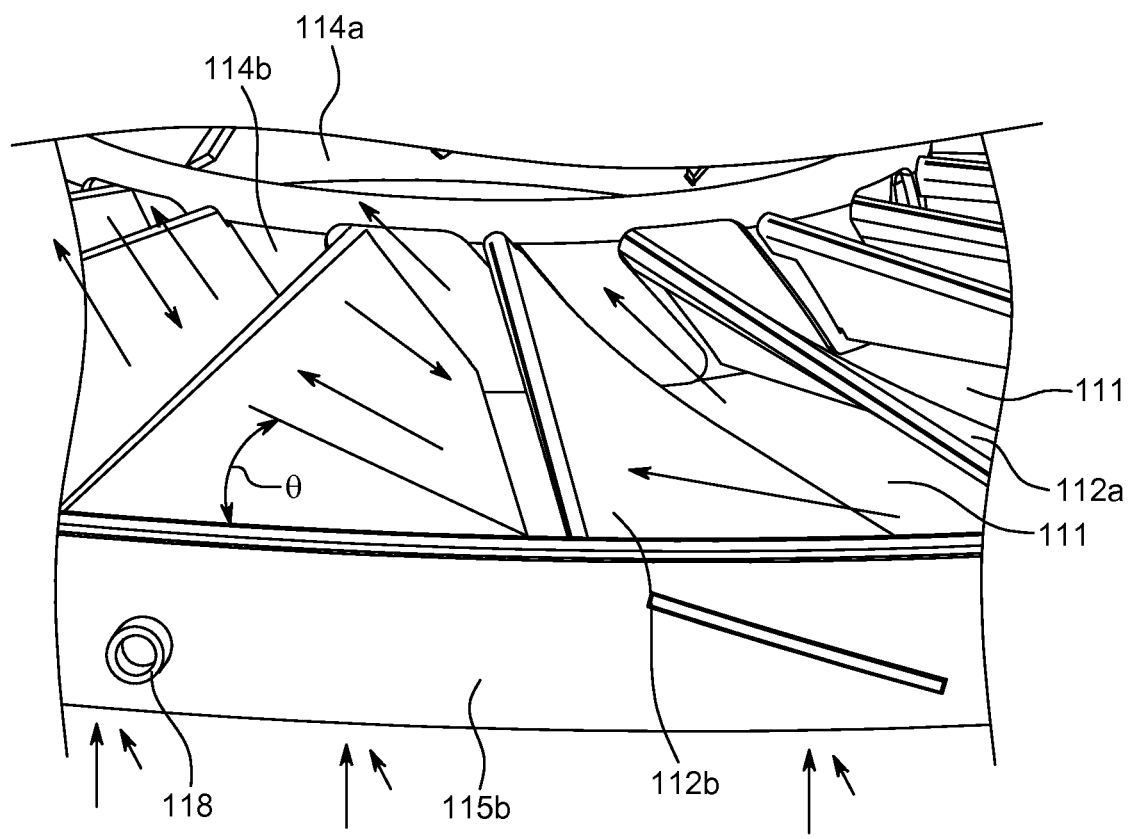
FIG. 11 shows an enlarged view of a section of the shield of the sixth embodiment of the invention shown in FIGS. 8 to 10, illustrating the flow of heated air and radiation through the shield in use of the cooking apparatus.

FIG. 7 shows a shield 101 of a fifth exemplary embodiment of the invention, including a central portion 113 and an outer ring 115. Six ribs 119 extend radially from the central portion 113 to the outer rib 115. A plurality of flat inclined blades 112 extend between the ribs 119. The blades 112 are straight in the fifth embodiment, unlike the curved concentric blades 112 of the fourth embodiment. The blades 112 serve to at least partially block a direct line of sight in a vertical direction D1 through the apertures 111, and to deflect at least some of the upward vertical flow of hot air 110 through the apertures 111. For example, the shield 101 may entirely block a direct line of sight in a vertical direction D1 through the apertures 111 and cause deflection of all upward flow of hot air 110 flowing through the apertures 111. The shield 101 of the fifth embodiment therefore also provides the advantages described above with respect to the shields of the previous embodiments of the invention.

FIGS. 8 to 11 show a shield 101 of a sixth exemplary embodiment of the invention. The shield 101 comprises for example first shield portion 120 and a second shield portion 121. The first shield portion 120 includes a first inner ring 114a and a first outer ring 115a. A set of first inclined surfaces 112a, for example a plurality of first angled blades 112a, extend between the first inner and first outer rings 114a, 115a. The second shield portion 121 includes a second inner ring 114b and a second outer ring 115b. A set of second inclined surfaces 112b, for example a plurality of second angled blades 112b, extend between the second inner and second outer rings 114b, 115b.

Advantageously, the first and second shield portions 120, 121 are connected concentrically about a central axis A-A, and the first shield portion 120 is rotatable about the axis A-A relative to the second shield portion 121. The first and second shield portions 120, 121 are moveable relative to each other so that the shield 101 can be disposed between a closed configuration C1 shown in FIG. 8, and an open configuration C2 shown in FIG. 9, to vary the size of the apertures 11 through the shield 101. In the open configuration C2, the apertures 111 are larger than in the closed configuration C1. Advantageously, in the open configuration C2, the shield 101 may at least partially block a direct line of sight in a vertical direction D1 through the apertures 111 and deflect at least some of the upward vertical flow of hot air 110 through the apertures 111. Advantageously, in the closed configuration C1, the shield 101 may entirely block a direct line of sight in a vertical direction D1 through the apertures 111 and cause deflection of all upward flow of hot air 110 flowing through the apertures 111. The shield 101 of the sixth embodiment therefore provides the advantages described above with respect to the shields of the previous embodiments of the invention.

Furthermore, the shield 101 of the sixth embodiment of the invention advantageously also enables a user to vary an open area of the shield 101, that is the area of the apertures 111, relative to the closed area, that is the area of the solid material of the shield 101 substantially comprising the first and second inclined surfaces 112a, 112b. For example, the amount to which the line of sight is blocked through the shield 101 and the amount of deflection of upward flow of hot air 110 flowing through the apertures 111 can be controlled and varied. This enables a user to balance the degree to which the flow of hot air can freely circulate and vary the intensity of the heat radiation passing directly through the shield 101 to influence cooking performance, with the degree to which hot air is deflected and direct line of sight through the shield 101 is blocked, to reduce pollution of the heating element 105 and reduce the production of smoke during a cooking operation. For example, increased radiation intensity may be desired for some cooking operations requiring browning or crusting of the food 109.

A portion of the cooking apparatus 100, for example an inner wall of the food preparation chamber 102 or the heating chamber 116, advantageously includes a first connection element 117. The shield 101 advantageously includes a second connection element 118. The first and second connection elements are advantageously engageable to removably secure the shield 101 in the cooking apparatus 100. This various embodiments of the invention preferably include such engageable connection elements 117, 118. However, these are shown in an exemplary form with respect to the shield 101 of the sixth embodiment of the invention, in FIGS. 8 to 11, and in particular FIG. 8. For example, the first connection element 117 may include one or more recessed slots in a wall of the cooking apparatus 100 and the second connection element 118 may include one or more projecting lugs extending from the outer ring 115 of the shield 101. The lug(s) 118 may be received in the slot(s) 117, for example in a bayonet-type fitting. However, it will be appreciated that alternative forms of connection elements 117, 118 are intended within the scope of the invention, such as clips, clasps, threaded connectors such as screws of bolts, or snap-fit connectors. Advantageously, this enables easy removal of the shield 101 for cleaning. For example, the heating element 105 may be permanently secured within the cooking apparatus 100 and not removable, so it is desirable to have the shield as removable for cleaning instead.

The shields 101 of at least some of the embodiments described herein may be formed as a single unitary component from a single body of material. For example, the shields 101 may be stamped from a flat sheet of material, such as a flat metal sheet.

The shields of the embodiments described herein are shown as being circular but the invention is not intended to be limited to such configuration, and alternative shaped shields 101 are intended to fall within the scope of the invention, for example elliptical, square, rectangular, or hexagonal.

The shield 101 may be made of a material having an emissivity value larger than 0.5. Having a relatively high emissivity for the shield 101 may help to enable heat radiation generated by the heating element 105 penetrating inside the food basket 103 through the parts of the shield 101 that block a direct line of sight through the shield 101 from the heating element 105 to the food basket 103 for a better heating and cooking of the food ingredients 109.

The shield 101 is advantageously made from a heat resistant material. The shield 101 may be made of a material taken among the set of materials defined by brushed stainless steel, coated stainless steel and aluminium. Brushed stainless steel may be advantageous because it has a relative large emissivity value. Coated stainless steel may be advantageous because it facilitates cleaning of the shield 101 by users. Aluminium may be advantageous due to its light weight. However, the shield 101 may alternatively be made of a non-metallic material, such as ceramic or plastic, provided the material possesses the necessary heat-resistant properties.

The invention also relates to a cooking apparatus 100 as described previously, comprising a shield 101 as described previously.

Preferably the shield 101 is spaced from the heating element 105 by at least 2 mm, and preferably between 2 to 5 mm. This spacing helps prevent the shield 101 becoming excessively heated by the heating element 105

The invention also relates to a method of reducing emission of fumes in a cooking apparatus 100, for example an air-based frying apparatus 100 comprising a food preparation chamber 102, a food support, such as a food basket 103, receivable in the food preparation chamber 102, a system 104 for circulating a flow of hot air, for example an upward flow of hot air, inside the food preparation chamber 102, a heating element 105 disposed adjacent, for example above, the food support 103 to heat the circulated air, the method comprising the steps of:
   disposing S1 a shield 101 between the heating element 105 and the food support 103 including a plurality of apertures 111 and a plurality of inclined surfaces 112; and
   passing S2 the flow of hot air through the apertures 111 from the food support 103.

Figure 12:
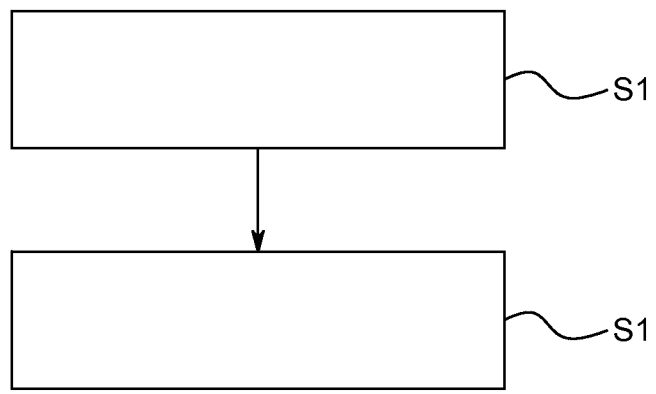
FIG. 12 shows a flow of a method according to the invention of reducing emission of fumes in a cooking apparatus.

The method of the invention is shown in the flow chart of FIG. 12.

In summary, a first function of the shield is smoke prevention. Oil/fat that reaches the heating element 105 will be burned and create smoke leaving the device via an exhaust, and pollute the surrounding ambient air (e.g. kitchen air volume). The shield 101 arranged between the support 103 (on which food 109 are disposed) and the heating element 105 contributes to reducing the amount of oil/fat that reaches the heating element 105 and so less smoke will be generated.

A second function of the shield is to protect the heating element 105 against pollution by reducing oil and fat particles carried by the air flow and/or splattered from the food support 103. The heating element 105 and reflector 122 are difficult to reach for cleaning. By putting a shield 101 between the food support and the heating element 105, there will be less oil/fat that reaches the heating element 105 and reflector 122, and so cleaning of those parts is less necessary. The shield 101 therefore is preferably removable from the apparatus 100 for easier cleaning.

A third function of the shield is the passage from airflow and radiation through the shield to help achieve good cooking result. The inclined surfaces 112 gives an optimum balance of allowing hot air flow and passage of radiation through the shield 101, versus the protecting of the heating element 105 and the reflector 122 against pollution.

A fourth function is of the shield is to guide the airflow in a certain direction, such as a swirling motion, as the hot air flow passes through the shield 101.

The following numbered paragraphs provide further disclosure of the present subject matter.

1. A shield (101) for use in a cooking apparatus (100) having a food preparation chamber (102) to receive a food support (103), a system (104) for circulating a flow of hot air inside said food preparation chamber (102) and a heating element (105) to heat at least the circulated air, the shield (101) being configured to be disposed between the heating element (105) and the food support (103), said shield (101) comprising a plurality of inclined surfaces (112) and a plurality of apertures (111) between said inclined surfaces (112) through which the flow of hot air can pass.
2. A shield (101) according to paragraph 1, wherein the inclined surfaces (112) comprise a plurality of blades.
3. A shield (101) according to paragraph 2, wherein the blades (112) extend radially from a central portion (113) of the shield.
4. A shield (101) according to any of paragraph 1 to 3, wherein the shield extends in a first plane (P) and the inclined surfaces (112) block a direct line of sight in a first direction (D1) substantially perpendicular to the first plane (P) though the apertures (111) in the shield.
5. A shield (101) according to any of paragraph 1 to 4, further comprising an inner ring (114) and an outer ring (115), the inclined surfaces (112) extending between the inner ring (114) and the outer ring (115).
6. A shield (101) according to any of paragraph 1 to 5 wherein the shield extends in a first plane (P) and the inclined surfaces (112) are angled (θ) at around 30 degrees to said first plane (P).
7. A shield (101) according to any of paragraph 1 to 6, further comprising a set of first inclined surfaces (112a) and a set of second inclined surfaces (112b), and wherein the first inclined surfaces and second inclined surfaces are moveable relative to each other to adjust the size of the apertures (111) in the shield.

8. A shield (101) according to paragraph 7 wherein the set of first inclined surfaces (112*a*) and the set of second inclined surfaces (112*b*) each comprise a first array of radial blades and a second array of radial blades extending from a first hub (114*a*) and a second hub (114*b*) respectively, wherein the first and second arrays of radial blades are rotatable about a common axis (A-A) relative to each other.

9. An air-based fryer apparatus (100) for preparing food, said apparatus comprising:
   a food preparation chamber (102);
   a food support (103) receivable in said food preparation chamber (102);
   a system (104) for circulating a flow of hot air inside said food preparation chamber (102);
   a heating element (105) to heat at least the circulated air; and
   a shield (101) according to any preceding claim disposed between the heating element (105) and the food support (103).

10. An air-based fryer apparatus (100) according to paragraph 9, comprising a heater compartment (116) formed above the food preparation chamber (102), the shield (101) being detachably connected to the heater compartment.

11. An air-based fryer apparatus (100) according to paragraph 9 or 10 wherein the shield (101) is spaced from the food support (103).

12. An air-based fryer apparatus (100) according to any of paragraphs 9 to 11, wherein the inclined surfaces (112) are adapted to block a direct line of sight vertically though the apertures (111) in the shield to prevent air flowing from the food support (103) to the heating element (105) through the apertures without being deflected by the inclined surfaces.

13. An air-based fryer apparatus (100) according to any of paragraphs 9 to 12, wherein the shield (101) extends over the entire area of the heating element (105).

14. An air-based fryer apparatus (100) according to any of paragraphs 9 to 13, wherein the system (104) is adapted to circulating the flow of hot air inside said food preparation chamber (102) from the food support (103) towards the heating element (105).

15. A method of reducing emission of fumes in a cooking apparatus (100) comprising a food preparation chamber (102), a food support (103) receivable in said food preparation chamber (102), a system (104) for circulating a flow of hot air inside said food preparation chamber (102), a heating element (105) to heat at least the circulated air, said method comprising the steps of:
   disposing (S1), between the heating element (105) and the food support (103), a shield (101) including a plurality of apertures (111) and a plurality of inclined surfaces (112); and
   passing (S2) the flow of hot air through said apertures (111).

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An air-based fryer apparatus having
   a food preparation chamber,
   a food support receivable in said food preparation chamber,
   a system for circulating a flow of hot air inside said food preparation chamber upward or downward through the food support,
   a heating element to heat at least the circulated air and
   a shield disposed between the heating element and the food support, wherein
   said shield extends in a plane (P) and comprises a plurality of inclined surfaces inclined with respect to the plane, each inclined surface radially extending along a length thereof in the plane between a central portion of the shield and an outer portion of the shield, and a plurality of apertures, each aperture radially extending along a length thereof between a pair of said inclined surfaces through which the flow of hot air can pass, wherein the plurality of inclined surfaces are adapted to block a direct line of sight through the apertures in the shield from the heating element to the food support to prevent air flowing from the food support to the heating element through the apertures without being deflected by the inclined surfaces.

2. The air-based fryer apparatus according to claim 1, wherein the inclined surfaces comprise a plurality of blades.

3. The air-based fryer apparatus according to claim 2, wherein the blades extend radially from the central portion of the shield.

4. The air-based fryer apparatus according to claim 1, wherein the inclined surfaces block a direct line of sight in a first direction (D1) substantially perpendicular to the plane (P) though the apertures in the shield.

5. The air-based fryer apparatus according to claim 1, further comprising an inner ring and an outer ring, the inclined surfaces extending between the inner ring and the outer ring.

6. The air-based fryer apparatus according to claim 1, wherein the inclined surfaces are angled (θ) at 30 degrees to said plane (P).

7. The air-based fryer apparatus according to claim 1, further comprising a set of first inclined surfaces in a first plane and a set of second inclined surfaces in a second plane, parallel to the first plane, and wherein the first inclined surfaces in the first plane and second inclined surfaces in the second plane, parallel to the first plane, are moveable relative to each other to adjust a size of the apertures in the shield.

8. The air-based fryer apparatus according to claim 7, wherein the set of first inclined surfaces and the set of second inclined surfaces each comprise a first array of radial blades and a second array of radial blades extending from a first hub and a second hub respectively, wherein the first and second arrays of radial blades are rotatable about a common axis (A-A) through the first hub and the second hub respectively, relative to each other.

9. The air-based fryer apparatus according to claim 1, wherein the heating element is disposed above the food support.

10. The air-based fryer apparatus according to claim 1, further comprising a heater compartment formed above the food preparation chamber, the shield being detachably connected to the heater compartment.

11. The air-based fryer apparatus according to claim 1, wherein the shield is spaced from the food support.

12. The air-based fryer apparatus according to claim 1, wherein the shield extends over an entire area of the heating element.

13. The air-based fryer apparatus according to claim 1, wherein the system for circulating the flow of hot air inside said food preparation chamber circulates the flow of hot air from the food support towards the heating element.

14. The air-based fryer apparatus according to claim 1, wherein the system for circulating a flow of hot air inside said food preparation chamber comprise a fan placed above the heating element.

15. An air-based fryer apparatus comprising:
a food preparation chamber;
a food support receivable in said food preparation chamber;
a system for circulating a flow of hot air inside said food preparation chamber upward or downward through the food support;
a heater compartment formed above the food preparation chamber, the heating compartment including a heating element to heat at least the circulated air; and
a shield detachably connected to the heater compartment and disposed between the heating element and the food support, wherein the shield extends in a plane (P) and comprises a plurality of inclined surfaces inclined with respect to the plane, each inclined surface being radially disposed along a length thereof in the plane extending between an inner ring in a central portion of the shield and an outer ring in an outer portion of the shield, and a plurality of apertures, each aperture being radially disposed along a length thereof between a pair of said inclined surfaces through which the flow of hot air can pass, wherein the plurality of inclined surfaces are adapted to block a direct line of sight through the apertures in the shield from the heating element to the food support to prevent air flowing from the food support to the heating element through the apertures without being deflected by the inclined surfaces.

16. The air-based fryer apparatus according to claim 15, wherein each inclined surface is angled ($\theta$) at 30 degrees to said plane (P).

17. The air-based fryer apparatus according to claim 15, further comprising a set of first inclined surfaces in a first plane and a set of second inclined surfaces in a second plane, parallel to the first plane, and wherein the first inclined surfaces in the first plane and second inclined surfaces in the second plane, parallel to the first plane, are moveable relative to each other to adjust a size of the apertures in the shield.

18. The air-based fryer apparatus according to claim 17, wherein the set of first inclined surfaces and the set of second inclined surfaces each comprise a first array of radial blades and a second array of radial blades extending from a first hub and a second hub respectively, wherein the first and second arrays of radial blades are rotatable about a common axis (A-A) through the first hub and the second hub respectively, relative to each other.

19. The air-based fryer apparatus according to claim 15, wherein the shield extends over an entire area of the heating element.

20. The air-based fryer apparatus according to claim 15, wherein the system for circulating the flow of hot air inside said food preparation chamber comprises a fan placed above the heating element that circulates the flow of hot air from the food support towards the heating element.

* * * * *